US007646989B2

(12) United States Patent
Kato

(10) Patent No.: US 7,646,989 B2
(45) Date of Patent: Jan. 12, 2010

(54) LIGHT EMITTING ELEMENT DRIVING DEVICE

(75) Inventor: Hiroshi Kato, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 264 days.

(21) Appl. No.: 11/213,862

(22) Filed: Aug. 30, 2005

(65) Prior Publication Data

US 2006/0279228 A1 Dec. 14, 2006

(30) Foreign Application Priority Data

May 31, 2005 (JP) ............................ 2005-160322

(51) Int. Cl.
*H04B 10/04* (2006.01)

(52) U.S. Cl. ....................... 398/197; 398/189; 398/195; 398/182; 398/171

(58) Field of Classification Search ................. 398/140; 315/193, 224
See application file for complete search history.

(56) References Cited

U.S. PATENT DOCUMENTS

| | | | | |
|---|---|---|---|---|
| 5,040,242 | A * | 8/1991 | Tsuchiya et al. | 398/116 |
| 6,023,357 | A * | 2/2000 | Miyasita | 398/139 |
| 6,118,221 | A * | 9/2000 | Kumasaka et al. | 315/209 PZ |
| 6,765,371 | B2 * | 7/2004 | Kataoka | 323/222 |
| 6,798,801 | B2 * | 9/2004 | Johnson | 372/38.02 |
| 7,262,582 | B2 * | 8/2007 | Warita et al. | 323/222 |
| 7,474,857 | B2 * | 1/2009 | Grace | 398/182 |
| 2004/0251854 | A1 * | 12/2004 | Matsuda et al. | 315/291 |
| 2005/0110469 | A1 * | 5/2005 | Inaba et al. | 323/222 |
| 2006/0018662 | A1 * | 1/2006 | Grace | 398/135 |
| 2006/0261752 | A1 * | 11/2006 | Lee | 315/291 |

FOREIGN PATENT DOCUMENTS

| | | | |
|---|---|---|---|
| DE | 197 32 828 | A1 | 2/1999 |
| DE | 100 13 215 | A1 | 9/2001 |
| WO | WO-03/098585 | A1 | 11/2003 |

* cited by examiner

*Primary Examiner*—Ken N Vanderpuye
*Assistant Examiner*—Hibret A Woldekidan
(74) *Attorney, Agent, or Firm*—Birch, Stewart, Kolasch & Birch, LLP

(57) ABSTRACT

A light emitting element driving device of the present invention comprises at least one light emitting element and a power supply device for generating a driving current of the light emitting element. The power supply device has a step-up type DC-DC converter circuit. The step-up type DC-DC converter circuit has a soft-start function for gradually increasing the driving current at a rise of the driving current in generation of the driving current. Thus can be provided a light emitting element driving device which is capable of suppressing an inrush current to be generated at turn-on of the main power supply of the power supply device.

5 Claims, 5 Drawing Sheets

LIGHT EMITTING ELEMENT DRIVING DEVICE

BACKGROUND OF THE INVENTION

1. Field of the Invention

The present invention relates to a light emitting element driving device and can be applied to a light emitting element driving device which can operate a plurality of LEDs.

2. Description of the Background Art

As a light source for backlight of a liquid crystal display, a light emitting element such as an LED (Light Emitting Diode) is used. For the purpose of controlling visibility and suppressing an increase of the power consumption by lighting, a function of controlling the amount of light (hereinafter, referred to as "dimming function") is provided.

The LED has a characteristic of changing its emission wavelength in accordance with a current value to be inputted. Further, by performing a PWM (Pulse Wide Modulation) control of the inputted current, the above dimming function is controlled.

Therefore, by controlling the pulse width of the PWM control while keeping the current value supplied to the LED constant, brightness can be changed without changing the emission wavelength of the LED.

FIG. 4 is a block diagram showing a circuit configuration of an LED driving device under the PWM control in the background art.

As shown in FIG. 4, the LED driving device comprises a step-up type DC-DC converter circuit 101, a first switch element 102 and a resistor 103. The step-up type DC-DC converter circuit 101 is constituted of an inductance 104, a second switch element 105, a diode 106, a capacitor 107 and a control circuit 108. To an output portion of the step-up type DC-DC converter circuit 101, a plurality of LEDs 109 are connected in series.

Next, an operation of the LED driving device in the background art will be discussed.

A control signal generation circuit 110 outputs a control signal for turn-on from an OFF state. Then, the first switch element 102 is brought into conduction and the control circuit 108 serves to increase an output voltage Vo of the step-up type DC-DC converter circuit 101.

It is assumed that the output voltage Vo exceeds a total forward voltage Vf of the LEDs 109 connected in series. Then, from the capacitor 107, a current Io flows into the LEDs 109, the first switch element 102 and the resistor 103.

The control circuit 108 monitors a voltage drop Vp of the resistor 103. Further, in the control circuit 108, a reference voltage Vref is set in advance. The control circuit 108 controls the second switch element 105 to be turned off if the voltage drop Vp reaches the reference voltage Vref.

As discussed above, when the second switch element 105 is turned off, the output voltage Vo of the step-up type DC-DC converter circuit 101 decreases and the current Io flowing from the capacitor 107 toward the LEDs 109 and the like also decreases. When the current value Io decreases, the voltage drop Vp of the resistor 103 also decreases. If the voltage drop Vp becomes lower than the reference voltage Vref, the control circuit 108 controls the second switch element 105 to be turned on.

Thus, since turn-on and turn-off of the second switch element 105 are repeated under the control of the control circuit 108, a constant current flows in the LEDs 109.

It is assumed that a control signal for turn-off from the ON state is outputted from the control signal generation circuit 110 for dimming the LEDs 109. Then, the first switch element 102 is interrupted and the current Io flowing in the LEDs 109 and the like thereby sharply decreases. When the current Io decreases, the voltage drop Vp of the resistor 103 becomes lower than the reference voltage Vref and the control circuit 108 serves to increase the output voltage Vo of the step-up type DC-DC converter circuit 101.

In order to prevent an increase of the output voltage Vo, the second switch element 105 is turned off at the same time as the first switch element 102 is turned off. Then, the power supply from the step-up type DC-DC converter circuit 101 to the LEDs 109 is stopped, the voltage across the capacitor 107 is kept almost equal to the total forward voltage Vf of the LEDs 109. An input voltage Vi does not have a value enough to drive the LEDs 109.

Therefore, by turning off both the switch elements 102 and 105 at the same time, in effect, the power supply from the step-up type DC-DC converter circuit 101 to the LEDs 109 is stopped and the voltage across the capacitor 107 is kept almost equal to the total forward voltage Vf of the LEDs 109.

The conventional mainstream of light source for backlight is a power-saving type used for an indicator, a portable device or the like. Therefore, the voltage across the capacitor 107 can be kept by a small capacity.

In recent, however, a high power type light emitting element (such as an LED) which can be used for a light source for backlight of an illumination equipment or a large-scale liquid crystal display has been developed. The power consumed in the light emitting element thereby becomes larger than conventional one. With an increase of the power consumed in the light emitting element, there arises a necessity to increase the capacity of the capacitor 107.

The upsizing of capacity of the capacitor 107 increases an inrush current at turn-on of a main power supply of a light emitting element driving device. FIG. 5 shows generation of the inrush current. In FIG. 5, the upper stage shows an output signal waveform from the control signal generation circuit 110, and the lower stage shows a current waveform in the inductance 104. As discussed above, when the inrush current becomes too large, the circuit portions such as the second switch element 105 and the LED 109 may be broken.

SUMMARY OF THE INVENTION

It is an object of the present invention to provide a light emitting element driving device which is capable of suppressing an inrush current.

The present invention is intended for a light emitting element driving device. According to the present invention, the light emitting element driving device includes a light emitting element and a power supply device. In the light emitting element driving device, at least one light emitting element is provided. The power supply device generates a driving current of the light emitting element. Further, the power supply device has a step-up type DC-DC converter circuit. The step-up type DC-DC converter circuit has a soft-start function for gradually increasing the driving current at a rise of the driving current in generation of the driving current.

Even if a light emitting element requiring large power consumption is provided and the capacity in the power supply device becomes larger, it is possible to suppress an inrush current to be generated at turn-on of the main power supply of the power supply device.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereafter, specific discussion will be made on the present invention on the basis of figures showing the preferred embodiment.

The First Preferred Embodiment

Figure 1:
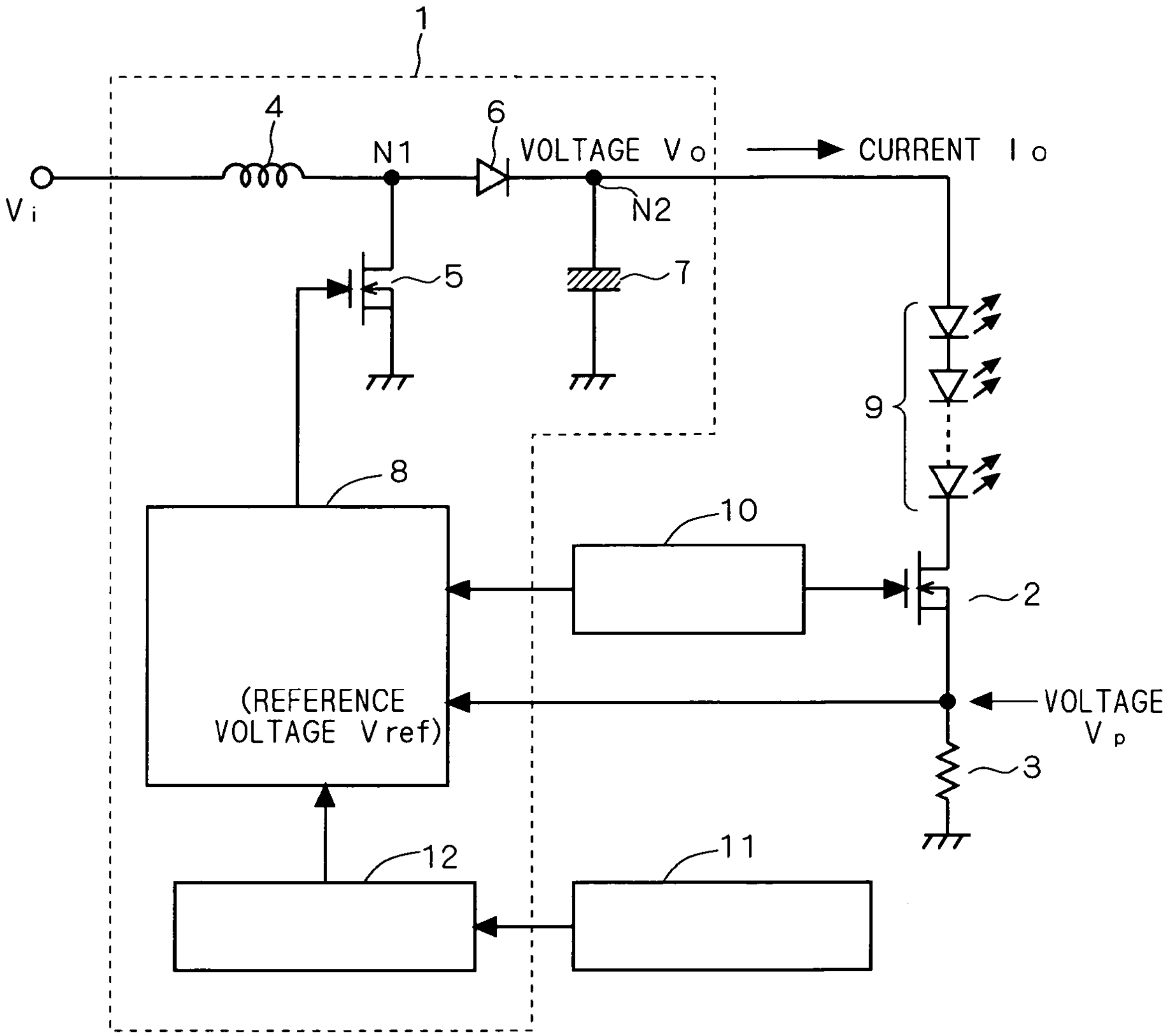
FIG. 1 is a block diagram showing a circuit configuration of a light emitting element driving device in accordance with the present invention.

FIG. 1 is a block diagram showing a circuit configuration of a light emitting element driving device in accordance with a first preferred embodiment.

As shown in FIG. 1, the light emitting element driving device is constituted of a light emitting element 9 and a power supply device having a step-up type DC-DC converter circuit 1 for generating a driving current for the light emitting element 9.

The driving current conceptually includes a current flowing in an inductance 4 and an output current to be supplied to the light emitting element 9 and is defined thus.

The power supply device is constituted of a first switch element 2, a resistor 3, a first control signal generation circuit 10 and a second control signal generation circuit 11, besides the step-up type DC-DC converter circuit 1.

In the light emitting element driving device, at least one light emitting element 9 is provided. In this preferred embodiment, the light emitting element 9 consists of a plurality of LED (Light Emitting Diode) elements. As shown in FIG. 1, the LED elements (hereinafter, referred to as "light emitting elements 9") are sequentially connected in series.

An anode side of the light emitting elements 9 connected in series is connected to an output line of the step-up type DC-DC converter circuit 1 discussed later. A cathode side of the light emitting elements 9 connected in series is connected to one main electrode of the first switch element 2. As shown in FIG. 1, the other main electrode of the first switch element 2 is connected to a reference potential (a ground potential in FIG. 1) through the resistor 3.

The first switch element 2 is controlled to turn on and off the driving current by a switching operation on the basis of a pulse signal of ON and OFF. In this preferred embodiment, when the pulse signal of ON is inputted to a control electrode of the first switch element 2, the first switch element 2 is brought into conduction. On the other hand, when the pulse signal of OFF is inputted to the control electrode of the first switch element 2, the first switch element 2 is interrupted. The first switch element 2 is controlled to be turned on and off by a dimmer pulse having a relatively long cycle.

Specifically, the first switch element 2 is controlled to be in an ON state from turn-on of the main power supply of the power supply device until the current flowing in the inductance 4 becomes stable and dimming is started.

The first switch element 2 is controlled to be turned on and off by a pulse having a relatively long cycle (for example, a cycle longer than a later-discussed relatively short cycle and not lower than 100 Hz) (hereinafter, the pulse is referred to as "a dimmer pulse", and the frequency of the dimmer pulse is therefore more than or equal to 100 Hz). With the switching operation of the first switch element 2 on the basis of the dimmer pulse, dimming of the light emitting elements 9 is performed. In other words, dimming of the light emitting elements 9 is performed by PWM (Pulse Wide Modulation) control.

The step-up type DC-DC converter circuit 1 has a soft-start function of gradually increasing the driving current of the light emitting elements 9. Specifically, the soft-start function works to gradually increase the driving current at a rise of the driving current in generation of the driving current.

Further, the step-up type DC-DC converter circuit 1 is constituted of an inductance 4, a second switch element 5, a diode 6, a capacitor 7, a control circuit 8 and a time constant circuit 12 as shown in FIG. 1. Next, a configuration inside the step-up type DC-DC converter circuit 1 will be discussed.

An input voltage Vi is inputted to one end of the inductance 4. The other end of the inductance 4 is connected to a first main electrode of the second switch element 5 and one end of the diode 6 through a node N1.

A second main electrode of the second switch element 5 is connected to a reference potential (a ground potential in FIG. 1). A control electrode of the second switch element 5 is connected to an output portion of the control circuit 8.

A switching operation of the second switch element 5 is controlled between ON and OFF. In this preferred embodiment, when a signal of ON is inputted to the control electrode of the second switch element 5, the second switch element 5 is brought into conduction. On the other hand, when a signal of OFF is inputted to the control electrode of the second switch element 5, the second switch element 5 is interrupted. With the switching operation of the second switch element 5, the driving current of the light emitting elements 9 is controlled to be turned on and off.

In an ON period until the current flowing in the inductance 4 becomes stable and another ON period of the dimmer pulse, the second switch element 5 is controlled to intermittently repeat ON and OFF in a relatively short cycle (e.g., 100 kHz to 1 MHz) (the control of ON and OFF will be discussed later). The driving current supplied to the light emitting elements 9 is kept almost constant by this control of ON and OFF in the relatively short cycle.

In a start-up time of the main power supply of the power supply device, the above-discussed soft-start function can be performed by gradually lengthening the ON period of the second switch element 5 (the ON period of the switching operation controlled to be ON and OFF in the relatively short cycle).

The control circuit 8 controls the second switch element 5 not to perform the soft-start function while the first switch element 2 is controlled by the pulse having the relatively long cycle (the dimmer pulse).

In the first control signal generation circuit 10 set is a dimming start time from the turn-on of the main power supply of the power supply device until the current flowing in the inductance 4 becomes stable and dimming is started.

In the time constant circuit 12 set is a time series variation of the ON-time width of the second switch element 5 in a stable arrival time from the turn-on of the main power supply of the power supply device until the current flowing in the inductance 4 becomes stable (the ON-time width of the second switch element 5 controlled to be turned on and off in the relatively short cycle is increased with time. With this operation, the soft-start function can be performed).

In the second control signal generation circuit 11 set is a predetermined time not larger than the dimming start time. Specifically, the predetermined time is any time in a period from the turn-on of the main power supply of the power supply device to start of transmission of the pulse having the relatively long cycle (i.e., start of the dimming). It is preferable that the above-discussed predetermined time should be longer than the stable arrival time. Discussion will be made below on a case where the above-discussed predetermined time is larger than the stable arrival time.

The second control signal generation circuit 11 transmits the pulse signal of ON from the turn-on of the main power supply of the power supply device until the predetermined time. The time constant circuit 12 receiving the pulse signal of ON controls the switching operation of the second switch element 5 under the control of the control circuit 8 on the basis of the time series variation of the ON-time width which is set in advance. In other words, the second switch element 5 is controlled to perform the soft-start function.

After the above-discussed predetermined time passes from the turn-on of the main power supply of the power supply device, the second control signal generation circuit 11 transmits the pulse signal of OFF. The time constant circuit 12 receiving the pulse signal of OFF controls not to perform the soft-start function after that.

Discussion will be back to a configuration inside the step-up type DC-DC converter circuit 1. The other end of the diode 6 is connected to the anode side of the light emitting elements 9 and one end of the capacitor 7 through a node N2. The other end of the capacitor 7 is connected to the reference potential (the ground potential in FIG. 1).

An input portion of the control circuit 8 and the control electrode of the first switch element 2 are connected to the first control signal generation circuit 10. The control circuit 8 has a construction to monitor the voltage drop Vp of the resistor 3. An input portion of the time constant circuit 12 is connected to an output portion of the second control signal generation circuit 11, and an output portion of the time constant circuit 12 is connected to the input portion of the control circuit 8.

Next, an operation of the light emitting element driving device in accordance with this preferred embodiment will be discussed, referring to the circuit configuration of FIG. 1 and the time chart of FIG. 2.

Figure 2:
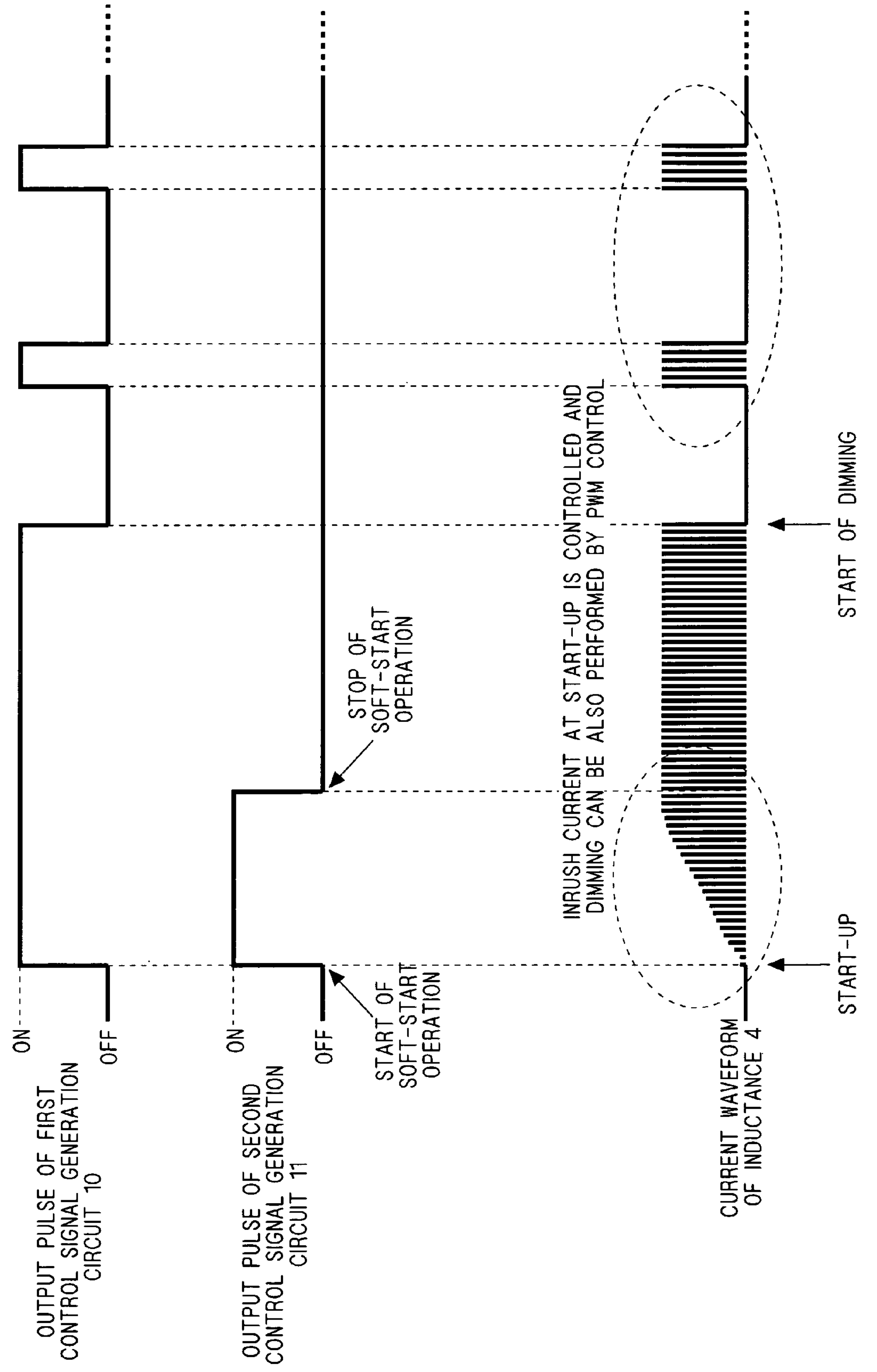
FIG. 2 is a timing chart used for discussion on an operation of the light emitting element driving device in accordance with the present invention.

In FIG. 2, the upper stage shows an output pulse of the first control signal generation circuit 10. The middle stage shows an output pulse of the second control signal generation circuit 11. The lower stage shows a waveform of the current flowing in the inductance 4.

In the upper stage of FIG. 2, the first pulse is in an ON state during the stable arrival time. The following pulse is the dimmer pulse. In the middle stage of FIG. 2, the pulse is in the ON state during the above-discussed predetermined time period. In the lower stage of FIG. 2, a lot of current pulse waveforms are shown and these waveforms rely on intermittent repeat of ON and OFF of the second switch element 5 in the relatively short cycle. In these current pulse waveforms, in a period while the soft-start function works (the current value gradually increases in FIG. 2), the ON width of the current pulse waveforms increases in time series as discussed above (in FIG. 2, for convenience of illustration, all the ON width are almost equal. But, actually, the ON width of the current pulse waveforms varies in series while the soft-start function works as discussed above).

When the main power supply of the power supply device is turned on, the step-up type DC-DC converter circuit 1 starts operation. Then, the first control signal generation circuit 10 transmits a control signal of ON to the first switch element 2 which interrupts the power to be supplied to the light emitting elements 9and to the control circuit 8. At the same time, the second control signal generation circuit 11 also transmits the control signal of ON to the time constant circuit 12.

Then, the first switch element 2 is brought into conduction and the control circuit 8 controls the switching operation of the second switch element 5 on the basis of the time series variation of the ON-time width set in the time constant circuit 12. Therefore, in the state where the soft-start function works, the output voltage Vo of the step-up type DC-DC converter circuit 1 gradually rises.

With the soft-start function, the inrush current at the start-up time of the power supply device is suppressed. Specifically, as shown in FIG. 2, the current flowing in the inductance 4 gradually increases.

It is assumed that the output voltage Vo exceeds the total forward voltage Vf of the light emitting elements 9 connected in series. Then, from the capacitor 7, a current flows into the light emitting elements 9, the first switch element 2 and the resistor 3.

The control circuit 8 monitors the voltage drop Vp of the resistor 3. Further, in the control circuit 8, the reference voltage Vref is set in advance. When the voltage drop Vp reaches the reference voltage Vref, the control circuit 8 controls the second switch element 5 to be turned off.

As discussed above, when the second switch element 5 is turned off, the output voltage Vo of the step-up type DC-DC converter circuit 1 decreases, the current Io flowing from the capacitor 7 to the light emitting elements 9 and so on also decreases. When the current value Io becomes smaller, the voltage drop Vp of the resistor 3 also decreases. Then, if the voltage drop Vp becomes lower than the reference voltage Vref, the control circuit 8 controls the second switch element 5 to be turned on.

The switching operation of the second switch element 5 between ON and OFF is performed in the relatively short cycle (e.g., 100 kHz to 1 MHz). Further, by repeating the switching operation of the second switch element 5 between ON and OFF under the control of the control circuit 8, the driving current of the light emitting elements 9 becomes constant as shown in FIG. 2.

After the main power supply of the power supply device is turned on, the predetermined time set in the second control signal generation circuit 11 passes. Then, as shown in FIG. 2, the second control signal generation circuit 11 transmits a control signal of OFF to the time constant circuit 12. The time constant circuit 12 receiving the control signal of OFF stops (cancels) the soft-start function after that.

Herein, as discussed above, the predetermined time set in the second control signal generation circuit 11 in advance is any time in the period from the turn-on of the main power supply of the power supply device to the start of transmission of the pulse having the above-discussed relatively long cycle (the dimmer pulse). In this preferred embodiment, before the soft-start function is stopped, the driving current flowing in the inductance 4 becomes stable.

As shown in FIG. 2, after the soft-start function is stopped (canceled), the time reaches the dimming start time set in the first control signal generation circuit 10. Then, for dimming the light emitting elements 9, the first control signal generation circuit 10 outputs a control signal of switching from ON to OFF.

Then, the first switch element 2 is interrupted and the current Io flowing in the light emitting elements 9 and the like sharply decreases. When the current Io decreases, the voltage drop Vp of the resistor 3 becomes lower than the reference voltage Vref and the control circuit 8 controls to increase the output voltage Vo of the step-up type DC-DC converter circuit 1.

In order to prevent an increase of the output voltage Vo, the first switch element 2 is turned off and the second switch element 5 is also turned off at the same time. Then, the power supply from the step-up type DC-DC converter circuit 1 to the light emitting elements 9 is stopped and the voltage across the capacitor 7 is kept almost equal to the total forward voltage Vf of the light emitting elements 9. Herein, the input voltage Vi does not have a value enough to drive the light emitting elements 9.

Therefore, by turning off both the first switch element 2 and the second switch element 5 at the same time, in effect, the power supply from the step-up type DC-DC converter circuit 1 to the light emitting elements 9 is stopped and the voltage across the capacitor 7 is kept almost equal to the total forward voltage Vf of the light emitting elements 9.

As shown in FIG. 2, for dimming the light emitting elements 9, the first control signal generation circuit 10 outputs a control signal of switching from OFF to ON. Then, the first switch element 2 and the second switch element 5 are brought into conduction again. Therefore, the current Io flows into the light emitting elements 9 again.

After that, as discussed above, with comparison between the voltage drop Vp and the reference voltage Vref, the control circuit 8 controls to intermittently repeat ON and OFF of the second switch element 5.

The turn-on and the turn-off of the second switch element 5 are performed in the relatively short cycle (e.g., 100 kHz to 1 MHZ). Further, by intermittently repeating the turn-on and the turn-off of the second switch element 5 under the control of the control circuit 8, the constant driving current flows in the light emitting elements 9 as shown in FIG. 2.

As discussed above, the cycle of the pulse signal from the first control signal generation circuit 10, which is outputted for dimming the light emitting elements 9, is relatively long. The dimming of the light emitting elements 9 can be performed by PWM control.

If the cycle of the pulse signal from the first control signal generation circuit 10 is not smaller than 100 Hz, by persistence of vision, visual recognition as constant brightness can be made. If the LEDs are adopted as the light emitting elements 9, by controlling the width of the pulse outputted for dimming while keeping the value of the current supplied to the LEDs, it is possible to change the brightness without changing the emission wavelength of the light emitting elements (LEDs) 9.

Thus, the light emitting element driving device of this preferred embodiment comprises the step-up type DC-DC converter circuit 1 having the soft-start function, and when the main power supply of the power supply device is turned on, the soft-start function is started (to work). In other words, the soft-start function works to gradually increase the driving current at a rise of the driving current in generation of the driving current of the light emitting elements 9.

Therefore, since electric charges are gradually accumulated in the capacitor 7, even if the capacity of the capacitor 7 becomes larger because of introduction of the light emitting elements 9 which require large power consumption, it is possible to suppress the inrush current at the start-up of the light emitting element driving device.

Though the light emitting element 9 consists of a plurality of LEDs which are sequentially connected in series in the above discussion, the light emitting element 9 may be one light emitting element requiring large power consumption.

As discussed above, if the light emitting element 9 requires small power consumption, no inrush current is generated. As the power consumption of the light emitting element 9 becomes larger, however, larger capacity of the capacitor 7 is needed. Therefore, since generation of the inrush current becomes more remarkable with the increase in capacity of the capacitor 7, application of the present invention has a great significance. In other words, if an enormous amount of light emitting elements 9 are provided and the light emitting elements 9 such as LEDs in enormous amount are sequentially connected in series, the application of the present invention has a greater significance.

Further, in this preferred embodiment, the step-up type DC-DC converter circuit 1 comprises the second switch element 5. In the control of turn-on and turn-off in the relatively short cycle, by gradually lengthening the ON period of the second switch element 5 in this cycle (this operation is performed by the time constant circuit 12 and the control circuit 8 in this preferred embodiment), the soft-start function can be performed.

Therefore, it is possible to achieve the soft-start function with a simple circuit configuration.

Further, the second switch element 5 is controlled to intermittently repeat ON and OFF in the relatively short cycle. Therefore, it is possible to control the driving current of the light emitting elements 9 to become almost constant with a simple circuit configuration.

The first switch element 2 is controlled to be turn on and off by the pulse having the relatively long cycle (the dimmer pulse). Therefore, it is possible to control the dimming of the light emitting elements 9 with a simple circuit configuration.

By setting the cycle of the dimmer pulse not smaller than 100 Hz, it is possible to control the dimming of the light emitting elements 9 without persistence of vision.

Further, as discussed above, the soft-start function is stopped (canceled) when the first switch element 2 is controlled by the pulse having the relatively long cycle (the dimmer pulse) (in other words, in dimming of the light emitting elements 9). This produces the following effect.

Figure 3:
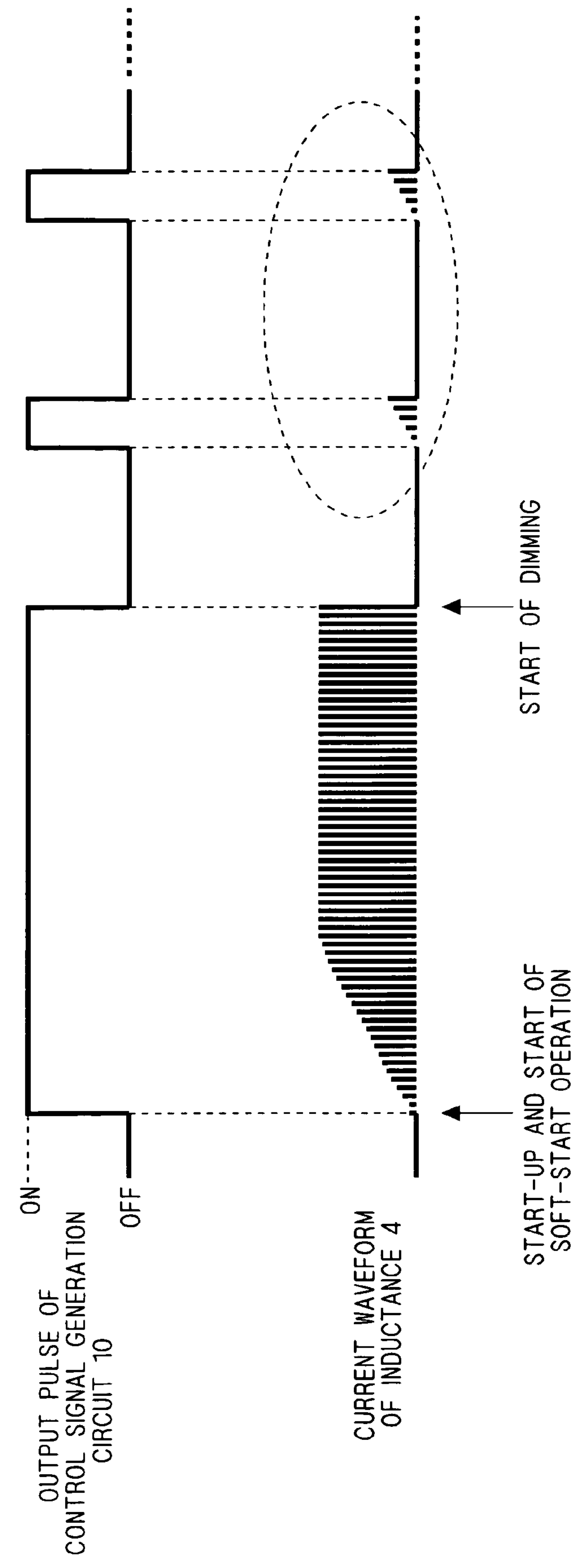
FIG. 3 is a timing chart used for discussion on a problem which arises if a soft-start function is always performed.
Figure 4:
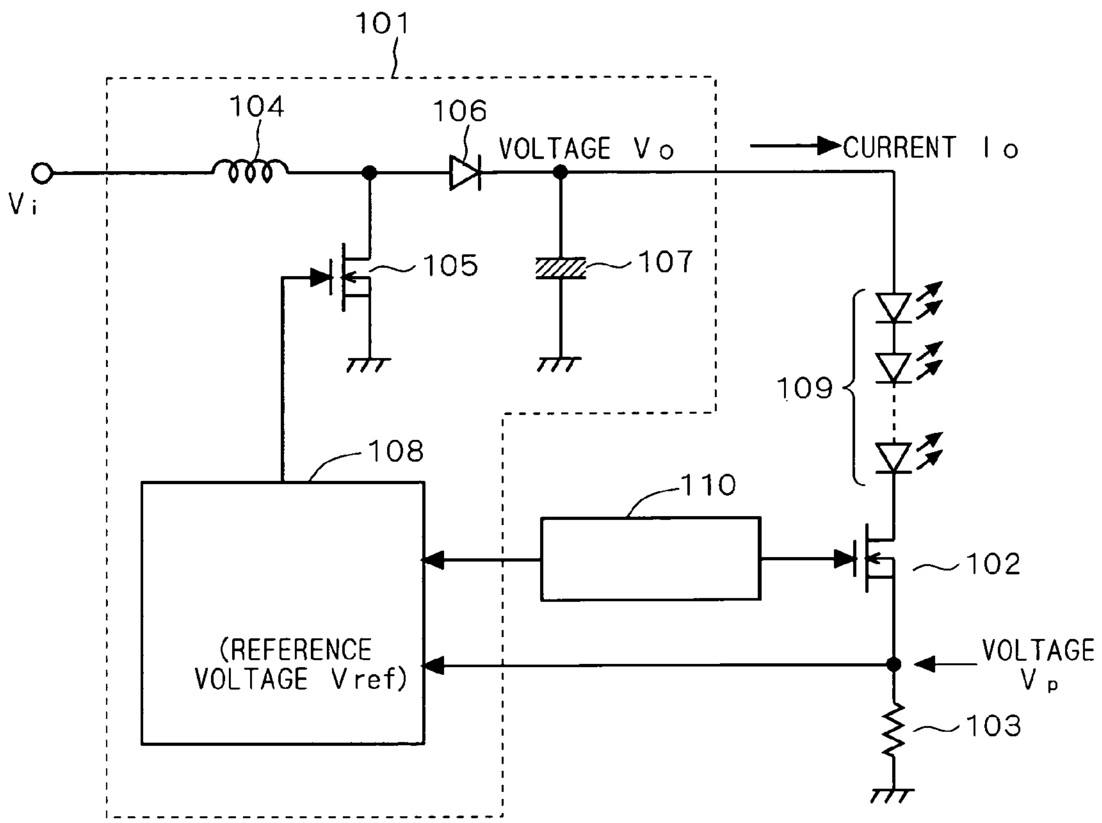
FIG. 4 is a block diagram showing a circuit configuration of a light emitting element driving device in the background art.
Figure 5:
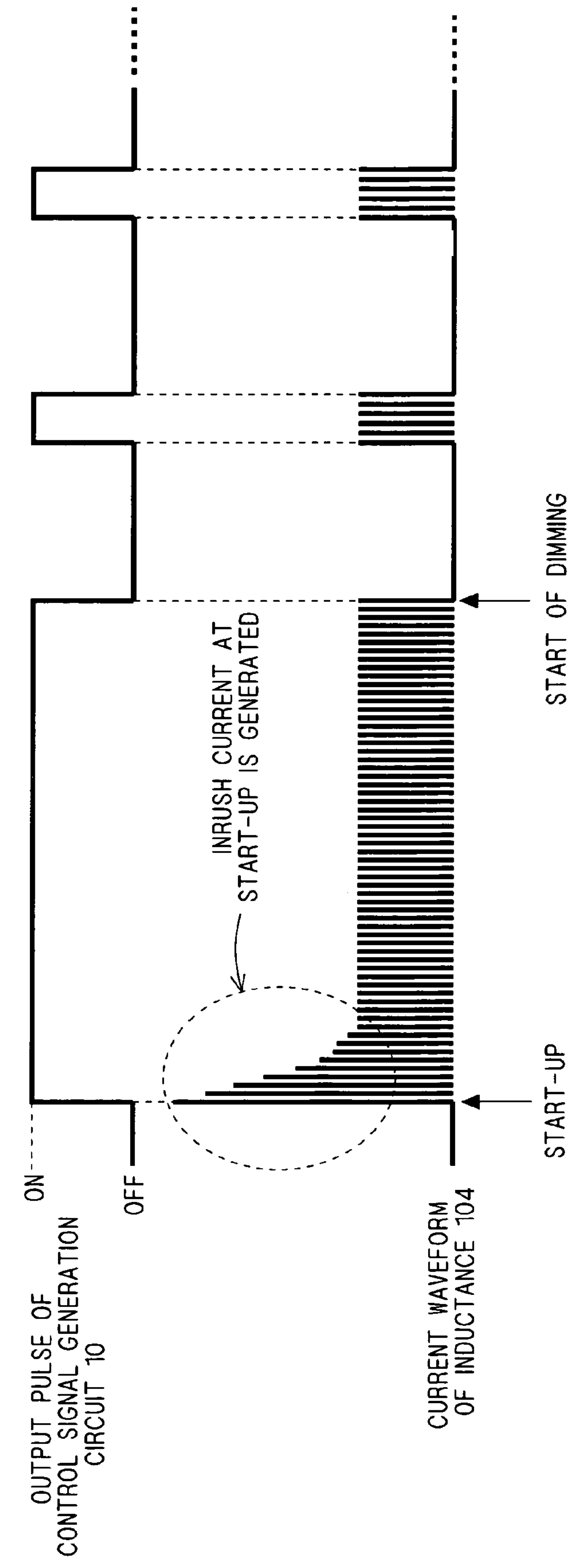
FIG. 5 is a timing chart showing an inrush current generated at turn-on of a power supply device.

FIG. 3 shows a case where the soft-start function is started to work at the same time as the turn-on of the power supply device and after that, the soft-start function continues to work. The upper stage of FIG. 3 shows the output pulse of the first control signal generation circuit 10. The lower stage shows the current waveform of the inductance 4.

As shown in FIG. 3, in a period from the start-up of the power supply device to the start of dimming, the soft-start function effectively works to suppress generation of the inrush current. But, also in dimming of the light emitting elements 9, every time when the output pulse from the first control signal generation circuit 10 rises, the soft-start function starts working. Therefore, as shown in FIG. 3, also in dimming of the light emitting elements 9, the rising speed of the current flowing in the inductance 4 becomes slower.

For this reason, there is a possibility that a necessary current does not flow in the inductance 4 and the output voltage Vo of the step-up type DC-DC converter circuit 1 can not rise up to the total forward voltage Vf. In such a case, some flicker of display is found or a constant brightness can not be achieved in dimming.

In the light emitting element driving device of this preferred embodiment, however, the soft-start function is stopped (canceled) while the first switch element 2 is controlled by the pulse having the relatively long cycle (the dimmer pulse).

Therefore, in dimming of the light emitting elements 9, the soft-start function can be canceled and it is thereby possible to prevent the flicker of display and keep the brightness in dimming constant.

Further, in the light emitting element driving device of this preferred embodiment, the power supply device can set a predetermined time. Herein, the predetermined time refers to a time period from the turn-on of the main power supply of the power supply device to the start of transmission of the pulse having the relatively long cycle (the dimmer pulse). In the period from the turn-on of the main power supply of the power supply device to the predetermined time, the soft-start function works and after the predetermined time passes, the soft-start function is stopped (canceled).

Therefore, it is possible to achieve a circuit to suppress only the inrush current at the start-up of the power supply device and stop (cancel) the soft-start function in dimming, with a simple design of circuit.

In the above discussion, the time constant circuit 12 and the control circuit 8 are separately provided. The control circuit 8, however, may have a function of the time constant circuit 12 and in such a case, with only the control circuit 8, the light emitting element driving device of this preferred embodiment can be achieved.

While the invention has been shown and described in detail, the foregoing description is in all aspects illustrative and not restrictive. It is therefore understood that numerous modifications and variations can be devised without departing from the scope of the invention.

What is claimed is:

1. A light emitting element driving device comprising:

at least one light emitting element; and a power supply device for generating a driving current of said light emitting element, said power supply device comprising a step-up type DC-DC converter circuit having a soft-start function for gradually increasing said driving current at a rise of said driving current in generation of said driving current, wherein said step-up type DC-DC converter circuit comprises a capacitor, one electrode of the capacitor is connected to a fixed electrode and the other electrode of the capacitor is connected to said light emitting element, further comprising a first switch element for turning said driving current on and off, wherein said first switch element is controlled to be turned on and off by a dimmer pulse having a relatively long cycle, said dimmer pulse started a predetermined time after a startup time, wherein said step-up type DC-DC converter circuit comprises a second switch element, and said soft-start function is performed by gradually lengthening an ON period of said second switch element, and wherein said second switch element is controlled to intermittently repeat ON and OFF in a relatively short cycle, and the relatively short cycle being less than the relatively long cycle.

2. The light emitting element driving device according to claim 1, wherein said at least one light emitting element includes a plurality of LEDs, which are sequentially connected in series.

3. The light emitting element driving device according to claim 1, wherein said soft-start function is stopped while said first switch element is controlled by said dimmer pulse.

4. The light emitting element driving device according to claim 3, wherein said power supply device is capable of setting any predetermined time in a period from turn-on of a main power supply of said power supply device to start of transmission of said dimmer pulse, and said soft-start function is performed from turn-on of said main power supply of said power supply device to said predetermined time and stopped after said predetermined time passes.

5. The light emitting element driving device according to claim 3, wherein a cycle of said dimmer pulse is not smaller than 100 Hz.

* * * * *